March 17, 1931.  F. M. POTTENGER, JR  1,796,940

SPRINKLING SYSTEM

Filed May 31, 1928

Inventor:
Francis M. Pottenger Jr,
by
Attorney

Patented Mar. 17, 1931

1,796,940

UNITED STATES PATENT OFFICE

FRANCIS M. POTTENGER, JR., OF MONROVIA, CALIFORNIA

SPRINKLING SYSTEM

Application filed May 31, 1928. Serial No. 281,623.

This invention pertains to sprinkling systems, for lawns or other vegetation, and is particularly applicable to systems in which sprinkler heads are utilized in fixed positions and arranged to sprinkle areas of definite size and shape. In its broader aspects it is similar to my invention shown and described in a co-pending application, filed May 31st, 1928, Serial No. 281,624, although in the instant case the specific means for accomplishing my purposes is different.

The principal object of my invention is to provide a means operable in connection with a water supply of definite head and pressure, whereby the pressure may be varied to effect the sprinkling of the entire areas.

I have conceived and perfected this invention particularly for use in connection with sprinkler heads like, or similar to, that shown and described in my co-pending application filed March 9th, 1923, Serial No. 623,960; however, it is to be understood that it may be utilized in connection with other types of sprinkler heads where applicable.

Sprinkler heads have been devised for sprinkling areas of definite size and shape and these have been found very effective; but in many cases they are primarily arranged for sprinkling only the outer portions of the areas without any particular regard for sprinkling the portions adjacent the sprinkler head, except as this may be accomplished by the light spray or drops falling from the streams directed to the outer portions.

As it is always a desideratum to conserve water supply and minimize the amount used for sprinkling lawns and the like, and at the same time provide an adequate irrigation, it is my foremost object to provide this means whereby an equal and adequate distribution of water over any particular area may be effectively accomplished with a minimum of waste. My present invention accomplishes this in a very efficient manner and is adaptable to all sprinkling or irrigating systems and may be adapted to water supplies of various heads and pressures.

The salient features of my invention are more fully set forth in the following specification, reference being made therein to the accompanying drawings for purposes of illustration.

Figure 1:
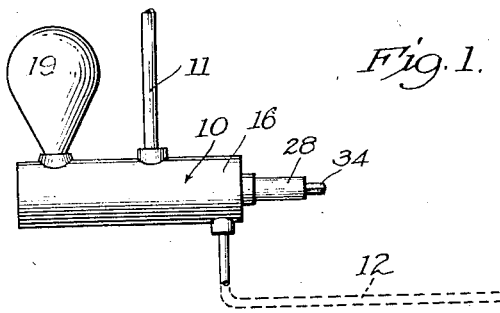
Fig. 1 is a diagrammatic view showing the use of my invention in connection with a lawn sprinkling system.

Referring now to these drawings the numeral 10 designates generally my improved variable control means, constructed somewhat on the principle of a hydraulic ram. The numeral 11 indicates a water supply pipe connected to the mechanism 10; and 12 a discharge pipe connected, as by means of laterals 13 and 14, to any number of sprinkler heads 15.

While heads 15 of any type may be utilized in this system, it may, for the purpose of disclosing the principles of my invention, be assumed that these are of a type similar to that shown in my aforementioned co-pending application for sprinkling areas of definite size and shape. With sprinkler heads of this type ordinarily the outer portions of the areas get the most water while those portions adjacent the sprinkler head get the least; consequently, either the outer portions get too much water or the inner portions do not get enough, within a given period of time, unless some means is devised for varying the force of the water supply and thereby altering the trajectories of the streams to throw them to points at different distances from the head. This I accomplish by the mechanism 10.

Figure 3:
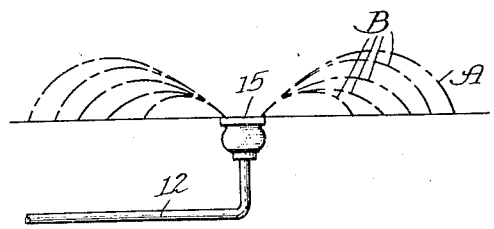
Fig. 3 is an enlarged sectional view through one form of mechanism I have designed for effecting a variable current in connection with a water supply of definite head and pressure.
Figure 3:
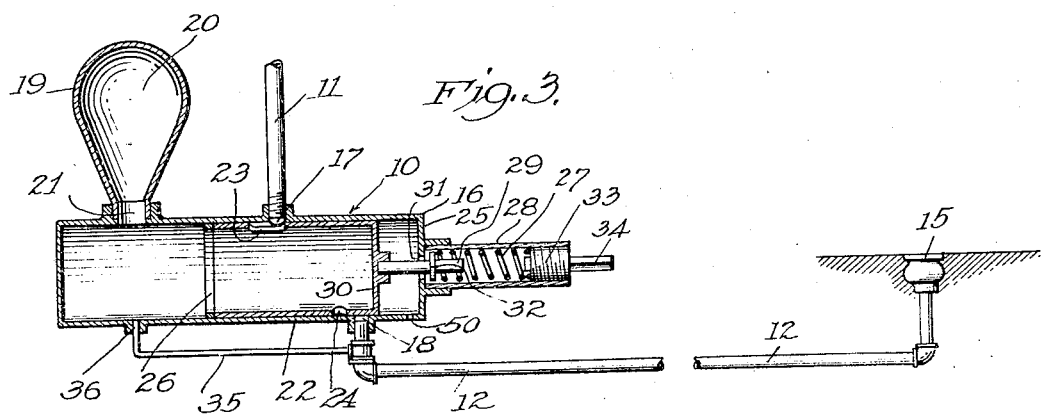

Referring now particularly to Fig. 3, the numeral 16 designates a cylinder of any desired size entirely closed except for the opening which I will particularly point out. The water supply pipe 11 is connected to the cylinder 16 through which water is supplied, preferably at a substantially definite and fixed pressure. This pipe is preferably positioned as shown and feeds through an inlet port 17. The discharge pipe 12 connects with an outlet port 18, in the cylinder 16, the latter preferably being positioned substantially as shown.

A dome 19 forming an air chamber 20 is mounted adjacent one end of the cylinder 16 and connects with the interior thereof through an unobstructed opening 21.

A cylinder valve 22 is slidably mounted within the cylinder 16, having the comparatively close sliding fit therein common to valves of this character. This valve has an elongated inlet port 23, adapted to register with the inlet port 17, and an outlet port 24, adapted to register with the outlet port 18. The end 25 of cylinder 16 forms a stop to limit movement of the valve 22 to the right in Fig. 3 while a ring 26, or other suitable means, forms a stop to limit its movement to the left.

The valve 22 is normally held in the position illustrated, with the inlet ports 17 and 23 in register, by means of an expansile helical spring 27, confined within a tubular housing 28 mounted on the cylinder end 25. This spring surrounds a stem 29—carried by the end 30 of valve 22 and extending through a bore 31 in end 25—and is confined between a collar 32 on stem 29 and a plug 33 screwthreadedly secured in the outer end of the housing 28. The force of spring 27 may be varied by screwing the plug 33 in or out, a stem 34 being provided for this purpose. This adjustment is desirable for adapting the mechanism to operate in connection with water supplies of different heads and pressures.

A comparatively small by-pass pipe 35 is provided, connecting at one end, as at 36, to the cylinder 16 and at its opposite end to the discharge pipe 12. This is of such size as to always deliver a small quantity of water to the sprinkler heads 15 so they will not be entirely shut off by operation of the mechanism and also to always insure its proper action.

Figure 2:
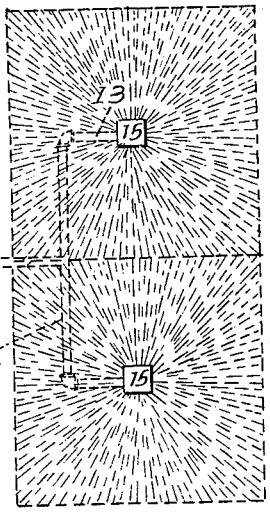
Fig. 2 is a diagrammatic view illustrating how a variable current accomplishes the entire sprinkling of a definite area.

In operation the control mechanism 10 may be connected to one or more of the sprinkler heads 15 through the discharge pipe 12, and to any suitable source of water supply, preferably under pressure, through the supply pipe 11. The valve 22 rests normally in the position shown in Fig. 3, with the inlet ports 17 and 33 in register and the outlet ports 18 and 24 out of register. Water supplied to the interior of the cylinder 16 through the pipe 11 first fills it and then enters the air chamber 20, through the opening 21, thereby compressing a quantity of air therein. Ordinarily the water pressure in pipe 11 will be sufficient to compress the air in chamber 20 to a comparatively high degree and this chamber will be of sufficient size, relative to the size of chamber 16 and pipes 11 and 12, as to give it considerable of an impetus on discharge. As soon as the cylinder 16 and air chamber 20 have been filled to their capacity the water pressure from pipe 11 moves the valve 22 to the right against the action of spring 27, cutting off the supply through inlet ports 17 and 23 and bring the outlet port 24 into register with port 18. The inlet port 23 is made slightly longer than the port 17 in order that the movement of valve 22 may be gotten under way and given an impetus before the supply through pipe 11 is entirely cut off. After the valve 22 has been started by the water pressure the air compressed in chamber 20 will continue its movement until ports 18 and 24 are in register at which time a quantity of the water in cylinder 16 will be discharged through the pipe 12. The strength of spring 27 will be such that its resistance to movement of the valve 22 may be overcome by both the pressure in pipe 11 and the air compressed in chamber 20 after each reach a predetermined point, but as soon as this pressure has been reduced by the discharge through ports 24 and 18 it will again act to move the valve to the left for refilling of the cylinder 16, and so on. This action will result in discharging the water through the heads 15 as illustrated diagrammatically in Fig. 2. When the ports 18 and 24 are first brought to register the higher pressure will throw the water its maximum distance as shown at A and as this pressure is gradually decreased by the discharge it will be thrown successively shorter distances, as indicated by the lines B, until the valve 22 has been moved so ports 18 and 24 are out of register.

It will be observed that this construction permits more or less flexibility of adjustment to adapt the mechanism to water supplies of different pressures, and that its use will enable an area to be watered over its entire surface by the variation in supply to the sprinkler heads.

While I have herein shown and described the preferred specific embodiment of my invention it is nevertheless to be understood that I reserve the right to make such changes or modifications in construction and arrangement as are permitted under the doctrine of equivalents and within the scope of the appended claims.

Having described a preferred form of my invention, I claim:

1. In a sprinkling system the combination of one or more sprinkler heads, a source of water supply and a supply pipe for delivering water to the heads under pressure, a water chamber connected in said supply pipe through which water passes to the heads, an air chamber mounted on top of said water chamber and connected therewith through an opening in its bottom so that air is confined therein and compressed when the water chamber is filled, a valve in the water chamber, yielding means to normally hold said valve in position, to permit filling of the water chamber and to prevent its discharge therefrom, said valve being operated by the pressure of the water supply against the action of said yielding means to cut off the supply of water to the chamber and permit its discharge therefrom.

2. In a mechanism of the class described, the combination of a water chamber, inlet and outlet ports in said chamber, a source of water supply under pressure connected with the inlet port, a valve slidably mounted in said chamber, inlet and outlet ports in said valve adapted to register with the inlet and outlet ports of the chamber when it is successively moved to different positions, and yielding means to removably hold the valve in position so its inlet port is in register with the inlet port of the chamber and said outlet ports are out of register said valve being operable by the pressure of the water supply to close the inlet port and open the outlet port.

3. In a mechanism of the class described, the combination of a water chamber, inlet and outlet ports in said chamber, a source of water supply under pressure connected with the inlet port, an air chamber connected with the water chamber through an opening in its bottom so air will be confined and compressed therein when the water chamber is filled, a cylinder valve slidably mounted in the water chamber having inlet and outlet ports adapted to register with the inlet and outlet ports of the water chamber when moved to different positions and operating to close one of said ports when the other is open, and yielding means to normally hold said inlet ports in register.

4. In a mechanism of the class described, the combination of a water chamber, inlet and outlet ports in said chamber, a cylinder valve closed at one end, slidably mounted in said chamber and having inlet and outlet ports adapted to register with the inlet and outlet ports of the chamber when moved to different positions to close one when the other is open, a stem on the closed end of the valve, a spring surrounding said stem adapted to normally hold the valve in position so the inlet ports are in register and the outlet ports out of register, said valve being adapted to be moved by water pressure in the chamber and valve against the action of said spring to close the inlet port and open the outlet port, and an air chamber mounted on the top of said chamber and connected therewith by an opening in its bottom.

5. In a mechanism of the class described, the combination of a water chamber, inlet and outlet ports in said chamber, a source of water supply under pressure connected with the inlet port, a cylinder valve open at one end slidably mounted in the water chamber having inlet and outlet ports adapted to register with the inlet and outlet ports of the water chamber when moved to different positions and operating to close one of said ports when the other is open, and yielding means to normally hold said inlet ports in register.

In witness that I claim the foregoing I have hereunto subscribed my name this 6th day of September, 1924.

FRANCIS M. POTTENGER, Jr.